United States Patent [19]
Dean et al.

[11] Patent Number: 6,071,442
[45] Date of Patent: Jun. 6, 2000

[54] METHOD FOR ALIGNING BORE FORMING PINS DURING MOLDING OF MULTI-FIBER OPTICAL CONNECTOR FERRULES

[75] Inventors: David L. Dean, Hickory; Alan J. Malanowski, Newton, both of N.C.; Michael D. Domaille, Rochester, Minn.

[73] Assignee: Siecor Corporation, Hickory, N.C.

[21] Appl. No.: 09/096,971

[22] Filed: Jun. 12, 1998

Related U.S. Application Data

[63] Continuation of application No. 08/627,639, Apr. 4, 1996, Pat. No. 5,786,002.

[51] Int. Cl.[7] .................................................. B29C 33/38
[52] U.S. Cl. ............................... 264/1.25; 264/2.5
[58] Field of Search .................... 264/1.24, 1.25, 264/2.5; 385/59; 29/600

[56] References Cited

U.S. PATENT DOCUMENTS

| | | | |
|---|---|---|---|
| 4,318,873 | 3/1982 | Porter | 264/1.25 |
| 4,689,005 | 8/1987 | Plummer | 264/1.25 |
| 4,753,515 | 6/1988 | Sato et al. | 264/1.5 |
| 4,951,380 | 8/1990 | Smith | 29/600 |
| 5,222,168 | 6/1993 | Saito et al. | 385/59 |
| 5,269,998 | 12/1993 | Takagi et al. | 425/468 |
| 5,389,312 | 2/1995 | Lebby et al. | 264/1.24 |
| 5,482,451 | 1/1996 | Johnson et al. | 425/468 |
| 5,637,264 | 6/1997 | Knapp et al. | 264/1.24 |
| 5,796,896 | 8/1998 | Lee | 385/59 |

OTHER PUBLICATIONS

Freeman, L.J. and Miller, C.M., Holding Fixture for Optical Fiber Array Connectors, pp. 7–8, Western Electric, 1978.

*Primary Examiner*—Robert Davis

[57] ABSTRACT

A guide block assembly and associated method are provided for retaining a plurality of fiber bore forming pins and at least one guide bore forming pin in precise relation to each other during molding of a multi-fiber ferrule used in a multi-fiber connector. The assembly comprises an array of fiber bore blocks each with a fiber bore therethrough to retain a respective one of the fiber bore forming pins. At least one guide block that defines a guide bore for retaining a guide bore forming pin is assembled with the array of fiber bore blocks. Adjoining surfaces are defined between adjacent fiber bore blocks and between the guide bore blocks and the array of fiber bore blocks. The use of bores more precisely retains the pins during the molding process, and the use of blocks with adjoining surfaces allows for the machining of such surfaces to precisely establish the relationships between successive fiber bore blocks and between the array of fiber bore blocks and the guide bore blocks.

13 Claims, 4 Drawing Sheets

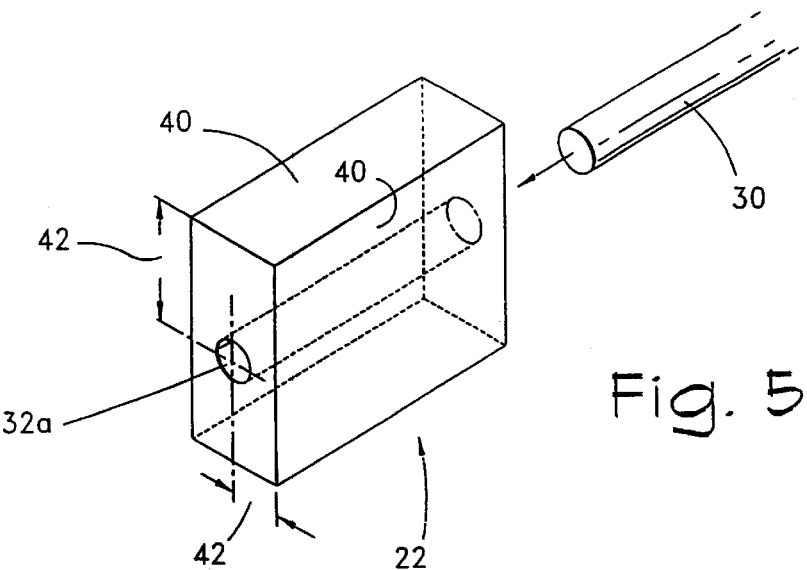
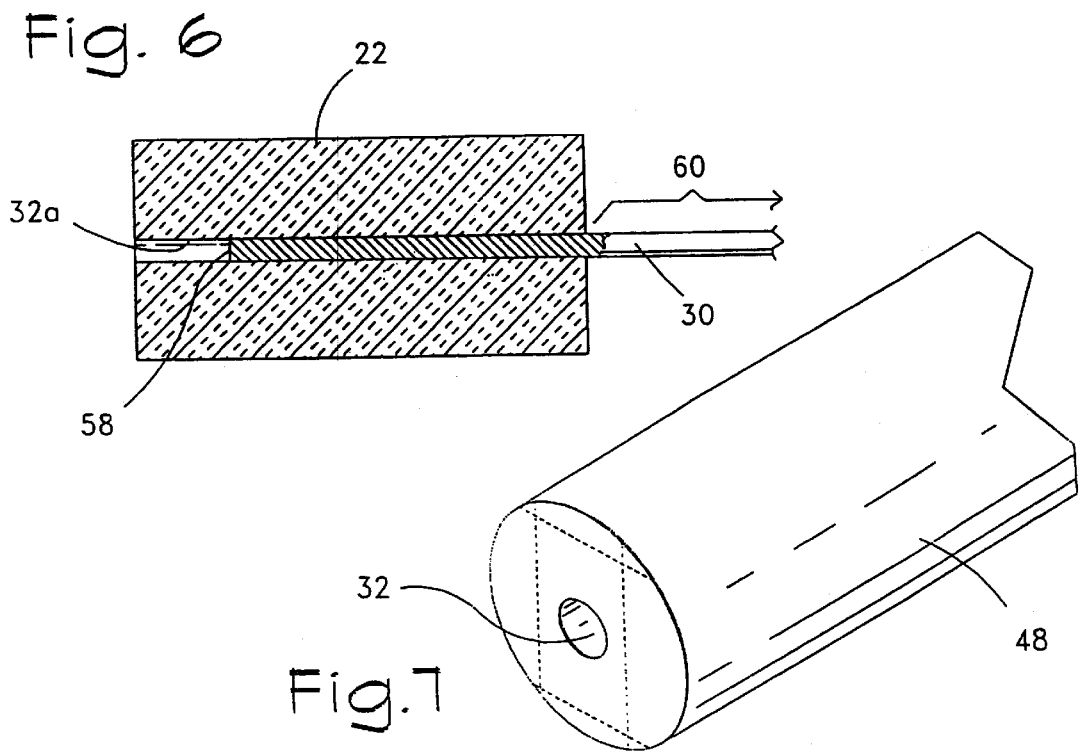

METHOD FOR ALIGNING BORE FORMING PINS DURING MOLDING OF MULTI-FIBER OPTICAL CONNECTOR FERRULES

This application is a continuation of application Ser. No. 08/627,639, filed Apr. 4,1996, and now U.S. Pat. No. 5,786, 002.

TECHNICAL FIELD OF THE INVENTION

The present invention relates to an apparatus and method for aligning and retaining bore forming pins that extend through a mold cavity for molding multi-fiber optical connector ferrules. In one aspect, the present invention relates to a guide block assembly and method that retain and align each bore forming pins in a respective bore defined in a respective block.

BACKGROUND OF THE INVENTION

The present invention is directed to one aspect of the molding process used to mold multi-fiber optical fiber ferrules of the type described in U.S. Pat. No. 5,214,730 to Nagasawa et al. The reference numerals 2, 3, 4 and 6 used in the Background of the Invention section are the same as those used in the Nasasawa patent. The multi-fiber ferrule is generally indicated by reference numeral 3 in FIG. 1 of Nagasawa. The term ferrule is used herein instead of the term "plug assembly" used in Nagasawa. "Ferrule" is a term of art that refers to the structure that receives the end of an optical fiber or fibers and then is abutted against an opposing ferrule to precisely align optical fibers for transmission of an optical signal. With reference to FIG. 1 of Nagasawa, the multi-fiber ferrule includes an array of optical fibers 2 disposed therein and guide bores 4 for receiving guide pins 6 to align two ferrules during the mating of the two ferrules.

In the typical molding of ferrules 3, bore forming pins extend through the mold cavity to create the guide bores 4 and the bores that receive optical fibers 2 from ribbon cable 1. After the ferrule is molded, then ribbon cable 1 is appropriately stripped and the individual fibers 2 are inserted into the fiber bores. Various techniques are used to fix the fibers in the molded ferrule and then the face 5 of the ferrule and the ends of the fibers 2 are polished.

As is known in the art, there is a premium placed on precise alignment of opposing optical fibers in a connector to minimize connection loss which diminished the qualify of the optical transmission through the connector. The issue of precisely aligning opposing optical fibers becomes even more sensitive with multi-fiber ferrules because of the need to precisely align all the optical fibers relative to each other and relative to the guide pin bores within the molded ferrule.

The prior art presently used a series of V-grooves machined into a block to retain bore forming pins extending through the mold cavity. FIG. 1 herein shows a cross-section of an example V-groove geometry where fiber bore forming pins 7 and guide bore forming pins 8 are shown disposed in V-grooves 9. The disadvantages of this or similar open groove constructions are many.

First, there is a tendency of the pins to float within the V-groove in the direction of arrow A during the molding process. This float contributes to imprecise alignment of the bores formed in the molded ferrule. Additionally, after repeated used of a mold cavity with the groove construction, flash begins to build up in areas indicated by B. This flash build up requires frequent cleaning of the V-grooves. Also, as can be seen, the pins contact the V-grooves along two lines of contact and thus all the friction forces of the repeated insertion and removal of the pins into the V-grooves are imparted along these two lines of contact thereby causing wear along the sides of the V-groove. This causes the alignment of the pins to become progressively more imprecise. Another disadvantage is that preciseness in the construction of the V-groove block in inherently limited. The V-grooves are machined into a stock piece without the ability to adjust the relationship of the grooves to each other.

Therefore a need exists for a guide block to retain the bore forming pins that reduces float of the pins during the molding process and improves wear resistance of the guide block. Additionally, a guide block is needed that eliminates the need to clean the guide block after each mold to remove flash. Additionally, a guide block is needed that allows the relationships between the bore forming pins to be continually adjusted during construction of the guide block to allow a more precise guide block to be constructed. Additionally, a need exists for a guide block that can be adjusted after it is constructed to account for gradual shifts in the bore pin relationships caused by repeated use of the guide.

SUMMARY OF THE INVENTION

One aspect of the present invention is a guide block assembly for aligning and retaining a plurality of fiber bore forming pins and at least one guide bore forming pin in precise relation to each other during molding of a multi-fiber optical connector ferrule. The assembly comprises a plurality of fiber bore blocks each of which defines a fiber bore therethrough sized for retaining a fiber bore forming pin. The fiber bore blocks are arranged together in an array such that the fiber bores are generally parallel defining an axial direction. Adjoining surfaces are defined between adjacent fiber bore blocks in the array.

The guide block assembly also comprises at least one guide bore block that defines bore therethrough sized for retaining one of the guide bore forming pins. The guide bore block is assembled with the array of fiber bore blocks such that the guide bore is oriented generally parallel with the fiber bores. Adjoining surfaces are defined between the at least one guide block adjacent fiber bore blocks.

Another aspect of the present invention is a method of aligning and retaining a plurality of fiber bore forming pins and at least one guide bore forming pin in precise relation to each other during molding of a multi-fiber ferrule. The method comprises the step of retaining each of the fiber bore forming pins in a respective fiber bore which is formed through a respective fiber bore block. Another step is adjoining the plurality of fiber bore blocks together in an array such that the fiber bores are parallel to each other defining an axial direction and defining adjoining surfaces between adjacent fiber bore blocks. Another step is retaining each of the guide bore forming pins in a respective guide bore which is formed through a respective guide bore block. Another step is adjoining the guide bore blocks to the array of fiber bore blocks such that the guide bores are parallel with the fiber bores and wherein adjoining surfaces are defined between the guide bore blocks and the array of fiber bore blocks. Another step is machining the adjoining surfaces between the fiber bore blocks and between the guide bore blocks and the array of fiber bore blocks such that when the fiber bore blocks and the guide bore blocks are assembled together, the desired relationships between successive fiber bores and between the fiber bores and the guide bores are achieved.

Another aspect of the present invention is a method of manufacturing a fiber bore block for use in a guide block assembly that is used for aligning and retaining fiber bore forming pins and guide bore forming pins in precise relation to each other during molding of a multi-fiber ferrule around such pins. The method comprises the step of machining in a first radial direction against a cylindrical ferrule until a first planar surface is formed along the length of the ferrule. The cylindrical ferrule already defines a precisely machined bore extending therethrough in the axial direction. Another step is machining in a second radial direction against the cylindrical ferrule until a second planar surface is formed along the length of the ferrule that is opposite of and generally with the first planar surface.

Another aspect of the present invention is a guide block assembly for aligning and retaining a plurality of fiber bore forming pins in precise relation to each other during molding of a multi-fiber ferrule. The guide block assembly comprises a plurality of fiber bore blocks. Each fiber bore block defines a fiber bore therethrough for retaining one of the fiber bore forming pins. The plurality of fiber bore blocks are assembled together in an array such that the fiber bores are generally parallel defining an axial direction and such that adjoining surfaces are defined between adjacent fiber bore blocks in the array. The adjoining surfaces are readily machinable when the fiber bore blocks are disassembled to allow precise positioning of the fiber bores relative to each other when assembled.

The assembly and methods of the present invention allow for the more precise construction of a guide block for retaining the bore forming pins during molding of the multi-fiber ferrules. Float of pins during the molding process is reduced, and the use of bores eliminates the build up of flash that needs to be removed after each molding. The guide block also has better wear resistance due to the frictional forces being distributed over the entire interior surface of the bores as opposed to lines of contacts as the V-groove.

Moreover, the relationships between the fiber bores and the guide bores are adjustable during construction of the assembly to achieve the desired preciseness. The relationships are also adjustable after the initial assembly is constructed to respond to shifts in the relationships between bores caused by the repeated use of the guide block assembly in the molding process.

BRIEF DESCRIPTION OF THE DRAWINGS

FIG. 5 is a perspective view of the preferred embodiment of the fiber bore block used in the present invention;

FIG. 6 is a longitudinal cross-section of the fiber bore block of FIG. 5;

FIG. 7 is a perspective view of cylindrical ferrule used in a method of the present invention to manufacture the fiber bore block of FIG. 5;

DETAILED DESCRIPTION

Figure 2:
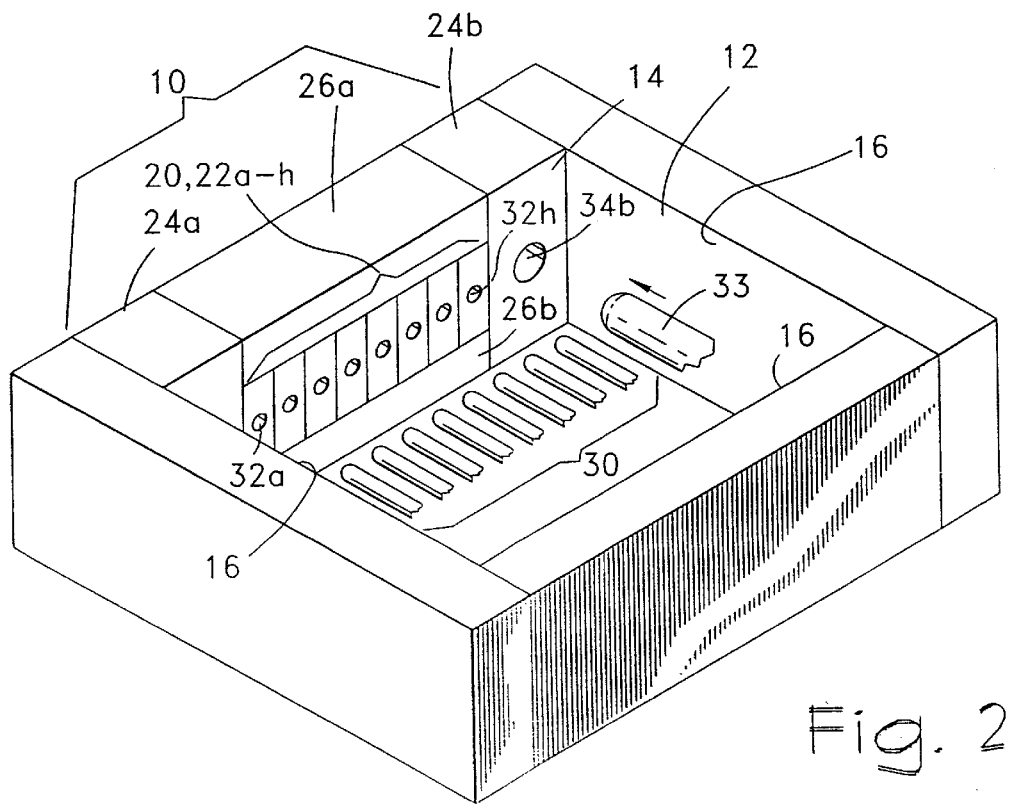
FIG. 2 is a perspective view of a representative arrangement of a mold cavity environment depicting the preferred embodiment of the guide block assembly of the present invention in relation thereto.
Figure 3:
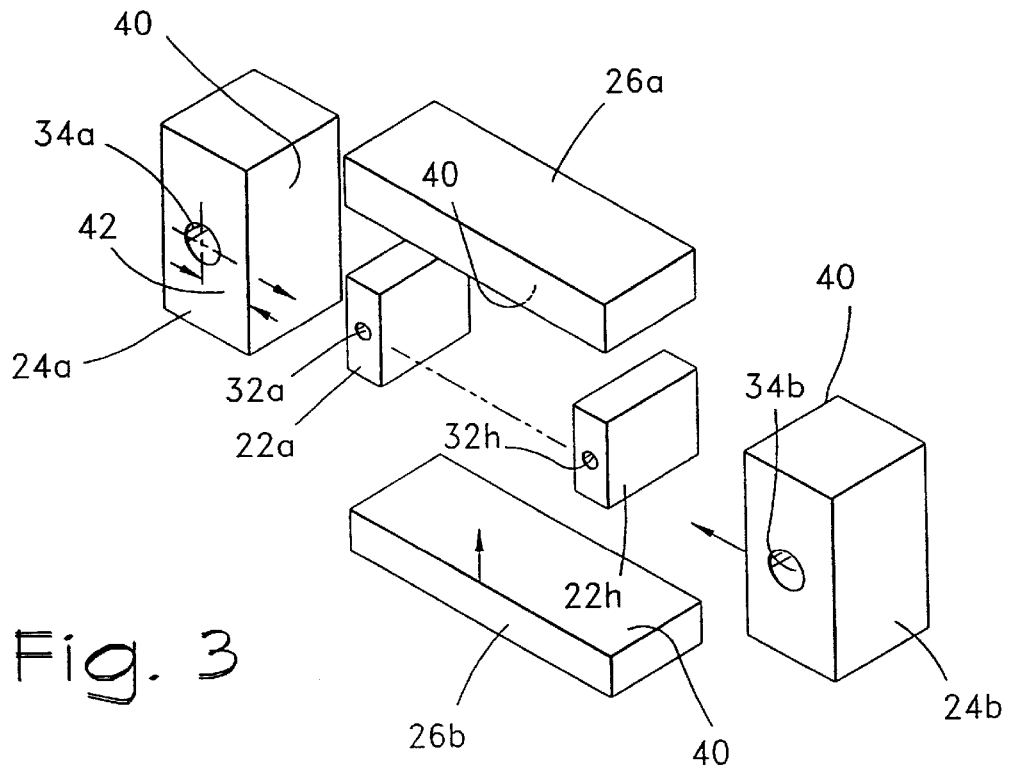
FIG. 3 is an exploded partial view of the preferred embodiment of the guide block assembly of the present invention.

With reference to FIGS. 2–8, the preferred embodiment of the guide block assembly 10 of the present invention is shown. FIG. 2 partially depicts a mold cavity 12 to illustrate the environment for guide block assembly 10. Assembly 10 has mold face 14 which can serve as one of the walls 16 which define part of mold cavity 12. Making up assembly 10 is an array 20 of fiber bore blocks 22a–h more particularly referenced in FIGS. 3–7. Guide bore blocks 24a and 24b confine array 20 in the lateral direction. Top spacer block 26a and bottom spacer 26b confine array 20 in the vertical direction. It should be understood that any number and configuration of fiber bore blocks 22 can be used. For example, two rows of eight blocks or four rows of four blocks may be used.

Assembly 10 is configured to retain a plurality of fiber bore forming pins 30 received in fiber bores 32a–h in fiber blocks 22a–h, respectively, and retain guide bore forming pins 33 in guide bores 34a–b in guide bore blocks 24a–b, respectively. Any suitable jig, not shown, can be used to translate pins 30 and 33 into and out of bores 32 and 34. During molding of a multi-fiber ferrule, the pins are inserted into the bores and the molding material flows around the pins. After the mold has set, the pins can be retracted to leave behind a plurality of molded bores. The fiber bore forming pins will create small inner diameter molded bores sized to receive an individual optical fiber in inclose tolerance. Fiber bore forming pins 30 may be the actual fibers when the connector will be molded directly around the fibers. The guide bore forming pins will create typically larger diameter molder bores sized to receive guide pins to mate two opposed multi-fiber ferrule in precise alignment.

Figure 1:
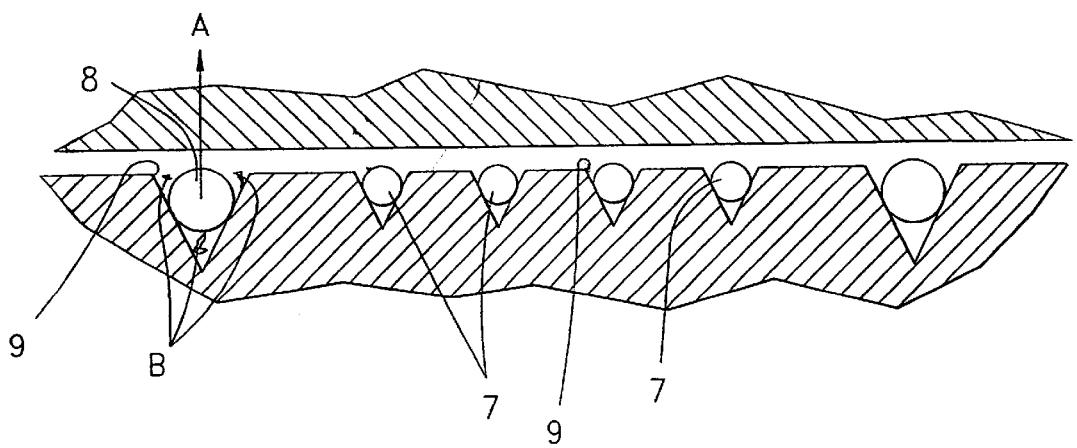
FIG. 1 is a cross-section of a prior art V-groove geometry used for guide blocks to retain bore forming pins.

The present invention is directed to an apparatus and method of being able to precisely arrange the fiber bore forming pins and the guide bore forming pins relative to each other in such away that the precision is repeatable over a large number of molding cycles. As discussed in the background of the invention, the method of arranging the bore forming pins with V-grooves such as shown in FIG. 1 suffers from floating of pins, flash build up, premature wear of the guide block, and the limits on preciseness of the relationships between the grooves as a result of machining the grooves in a single stock piece. By using bores in an array of blocks, float is reduced, wear is reduced, flash build up is eliminated and the relationships between the bore forming pins in the bore blocks is more precise. Specifically, bores 32 and 34 provide less room for floating of the bore forming pins 30 and 33 during the molding process. By having a cylindrical bore 32 or 34, the contact of the bore forming pin to the bore is spread across a larger surface area thereby decreasing wear of the bore compared to V-grooves which have only lines of contact with the bore forming pins which lend themselves to faster wear.

Another advantage of the present invention is that having an array of blocks allows the guide block assembly to be fine tuned until the relationship of the bores are extremely precise. Once the precise guide block is made, it is used repeatedly in the molding process and can be adjusted from time to time to account for shifts in the relationships caused by repeated use. This feature of adjustability can best be described with reference to FIG. 3 which is a partially exploded perspective of guide block assembly 10. The adjoining fiber bore blocks 22a–h, guide bore blocks 24a–b, and spacer blocks 26a–b define adjoining surfaces 40 which can be precisely machined and polished. Each block has at least one critical distance which is defined as the distance between the centerline of the bore in such block in a normal direction to any adjoining surface 40 of such block. For example, guide bore block 24a has one critical distance 42 between the centerline of guide bore 34a and adjoining surface 40 which adjoins against fiber bore block 22a. Distance 42 is critical because it contributes to establishing a precise relationship between guide bore 34a and the remainder of the bores. If not enough material is removed from adjoining surface 40 of guide bore block 24a in the initial construction of the blocks for a guide block assembly, then a measurement is taken of guide bore block 24a to determine the amount of machining or polishing that is needed to achieve critical distance 42. The critical distance can be precisely approached by iterations of these steps.

If too much material is removed from adjoining surface 40 of guide bore block 24, then the block is either discarded to start over with another block, or some type of shim or plating technique is used to make up the critical distance. The preferred construction of guide block assembly involves iterations of machining, measuring and machining to approach the desired critical distance 42. This same methodology may be used on each critical distance 42.

However, there are some short cuts that may apply to precisely constructing guide block assembly 10. For example, fiber bore blocks 22a–h may be initially machined close to the critical distance. Then, two or more of fiber bore blocks 22a–h can be rearranged in different orders in an attempt to find an order that achieves the desired preciseness of the relationship between fiber bores 32a–h.

With additional reference to FIGS. 5–7, fiber bore blocks 22a is generally rectilinear and defines fiber bore 32a extending therethrough in a direction defined as the axial direction. A representative fiber bore forming pin 30 is shown in position to be inserted into fiber bore 32a. FIG. 6 shows a longitudinal cross-section of fiber bore block 22a with fiber bore forming pin 30 having distal end 58 disposed in fiber bore 54 and mold zone 60 of fiber bore forming pin 30 disposed outside of fiber bore block 22 where resin or plastic used in the molding process will form around mold zone 60 of fiber bore forming pin 30.

All of the four planar surfaces parallel with the axial direction are adjoining surfaces 40 for fiber bore block 22a. Therefore, fiber bore block 22a has four critical distances 42 extending from the centerline of fiber bore 32a in a normal direction to each adjoining surface 40. To aid in achieving critical distances in the minimum amount of iterations, fiber bore block 22a is preferably machined from commercially available cylindrical ceramic ferrule 48 which is supplied with precisely machined bore 32 as shown in FIG. 7. Machining operations are applied against the ferrule in four different radial directions to create the rectilinear wafer structure of fiber bore blocks 22a–h. One aspect of the present invention is this method of manufacturing a fiber bore block.

Alternatively, ceramic ferrule 48 may be machined to have only two or three planar surfaces. The top and/or bottom may remain arcuate with spacer blocks 26 adjoining against such arcuate surfaces. As another alternative, the use of shims or plating techniques may be incorporated with the present invention. For example, metal shims may be placed between one or more adjoining surfaces to aid in achieving the critical distances. In such an example, either the shim, the adjoining surfaces or both may be machined to adjust the guide block assembly.

The ceramic material lends itself to precise machining as is known in the ceramic ferrule art. Because cylindrical ceramic ferrules have long been used in optical fiber connectors, suppliers have been producing ceramic ferrules with precise bores as required by optical fiber connectors. Kyocera Industrial Ceramics Corp. is an example of suppliers of such ceramic ferrules. By being able to use a readily available, precisely bored ferrule as starting stock for the fiber bore blocks, the iterations needed to create a sufficiently precise fiber bore block are minimized. Fiber bore blocks 22 may also be made of sapphire, other suitable jewel, or metal.

By using readily available, precisely bore ferrules, the advantages discussed above with regards to using a cylindrical bore as opposed to a V-groove are even more significant because the already established preciseness of the ceramic ferrule bore eliminates the need to machine bores 32 and 34 in constructing guide block assembly 10. In contrast, a V-groove guide block requires that the V-grooves be machined into a piece of stock. Additionally, machining all the V-grooves into one piece of stock does not allow critical distances to be precisely obtained through iterations of machining and measuring.

Guide bore blocks 24a, b and spacer blocks 26a, b are preferably made from hardenable mold steel. The guide bore blocks and spacer blocks may be eliminated from the guide block assembly. For example, multifiber ferrules may be designed with a sleeve instead of guide pins to align the two ferrules. In such a case, there is no need for guide bore blocks.

Another aspect of the present invention is a method of aligning and retaining a plurality of fiber bore forming pins and at least one guide bore forming pin generally in accordance with the operation of the guide block assembly discussed above. The plurality of bore forming pins are retained in fiber bores that extend through fiber bore blocks arranged in an array between two guide bore blocks. Two guide bore forming pins are retained in a respective guide bore formed in a respective guide bore block. All the bores are oriented parallel to each other. The guide bore blocks and fiber bore blocks define adjoining surfaces between adjacent blocks. The adjoining surfaces are machined such that when the blocks are assembled together, the desired relationships between successive fiber bores and between the fiber bores and the guide bores are achieved.

Figure 4:
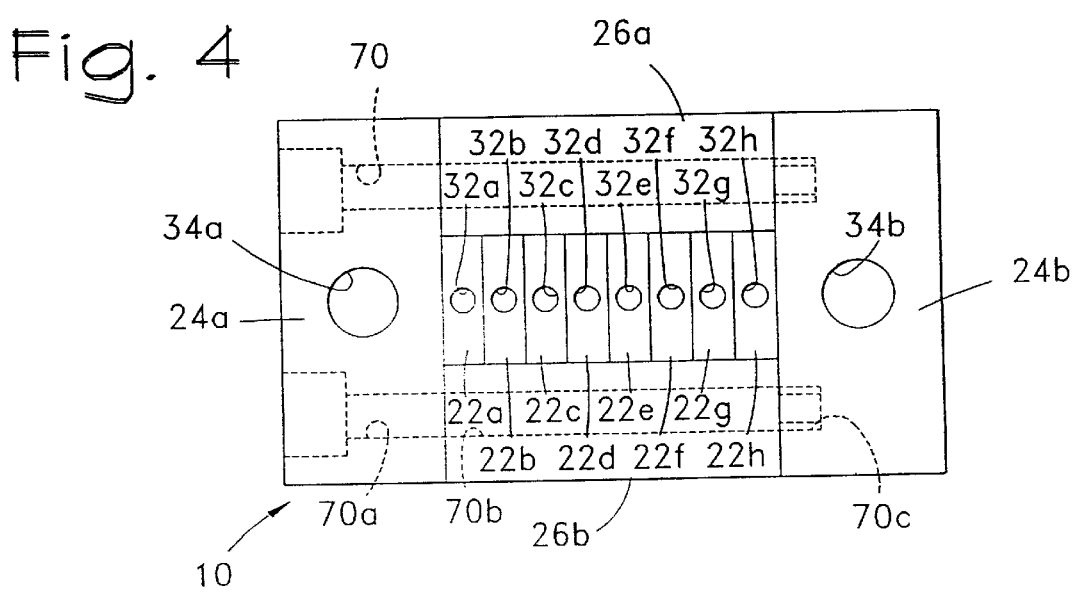
FIG. 4 is an end view of the preferred embodiment of the guide block assembly of the present invention.
Figure 8:
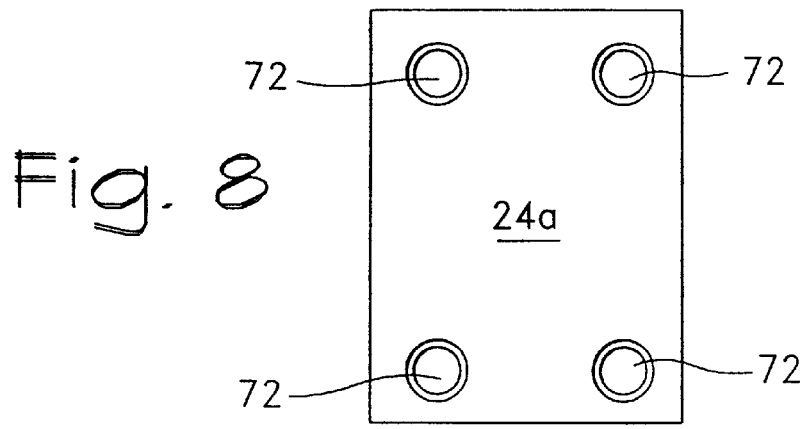
FIG. 8 is a side view of the guide block assembly of the present invention.

The various blocks of the guide block assembly can be held together in a variety of ways. The preferred embodiment of such attachment is shown in FIGS. 4 and 8. Four continuous passageways 70 are located as shown, each of which comprises passageway 70a bored through guide bore block 24a, passageway 70b bored through bottom spacer block 26b, and passageway 70c bored into guide bore block 24b. Some type of self tapping bolt 72 may be threaded through passageways 70 to pull guide bore blocks 24a and 24b toward each other thereby clamping the array of fiber bore blocks in the lateral direction. Alternatively, passageway 70c may extend through guide bore block 24b so that any type of nut and bolt arrangement can be used. Furthermore, additional passageways similar to passageways 70 may be located elsewhere through the blocks of the guide block assembly if more balanced clamping or bolting forces are desired. Alternatively, the blocks of guide block assembly may be retained together merely by walls 16 of the mold thereby eliminating the need for bolts 72.

Figure 9:
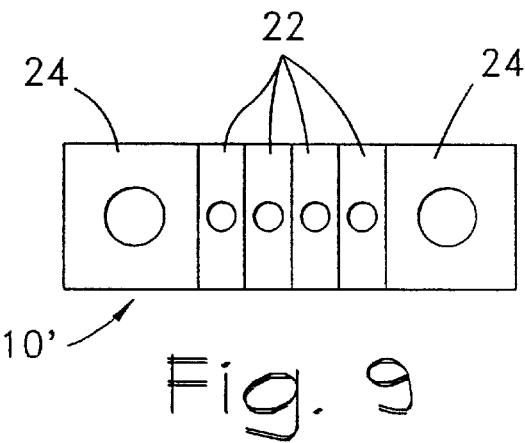
FIG. 9 is an end view of an alternative embodiment of the guide block assembly of the present invention.
Figure 10:
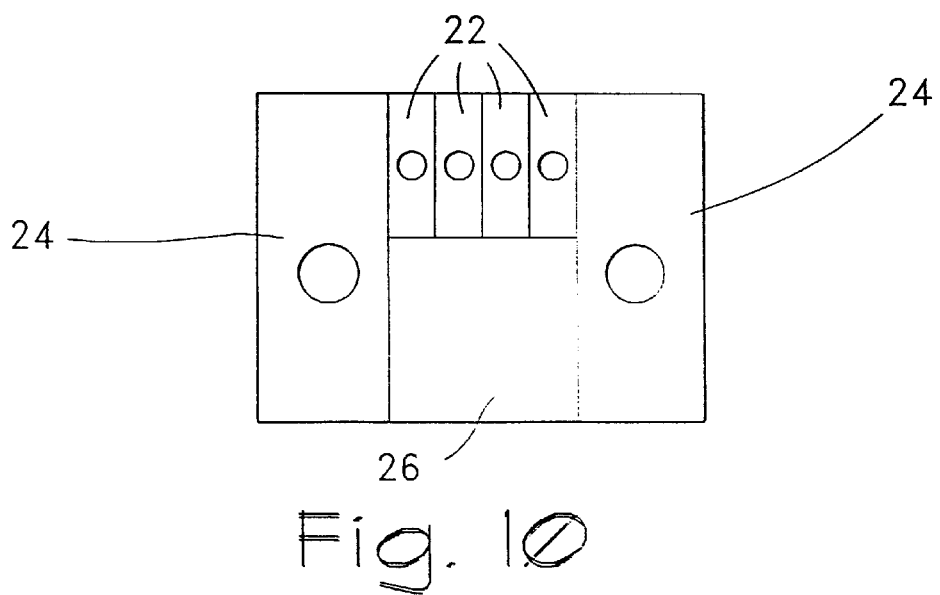
FIG. 10 is an end view of another alternative embodiment of the guide block assembly of the present invention.

The arrangement of the blocks of guide block assembly is only one of a variety of possible arrangements. FIGS. 9–10 illustrate alternative block arrangements of fiber bore blocks 22 and guide bore blocks 24 with and without spacer blocks 26. FIG. 9 does not include spacer blocks and only includes four fiber bore blocks for the molding of a four fiber ferrule.

Although the present invention has been described with respect to certain embodiments, it should be understood that various changes, substitutions and modifications may be suggested to one skilled in the art, and it is intended that the present invention encompass such changes, substitutions and modifications as fall within the scope of the appended claims.

What is claimed is:

1. A method of aligning and retaining a plurality of fiber bore forming pins and at least one guide bore forming pin in precise relation to each other during molding of a multi-fiber ferrule, the method comprising the steps of:

(a) retaining each of the plurality of fiber bore forming pins in a respective one of a plurality of fiber bores, each of the plurality of fiber bores extending through a respective one of a plurality of fiber bore blocks;

(b) adjoining the plurality of fiber bore blocks together in an array such that the plurality of fiber bores are parallel to each other and defining an axial direction and wherein adjoining surfaces are defined between adjacent fiber bore blocks;

(c) retaining each of the at least one guide bore forming pin in a respective one of at least one guide bore, each guide bore extending through a respective one of at least one guide bore block;

(d) adjoining the at least one guide bore block to the array of fiber bore blocks such that the guide bore is oriented generally parallel with the fiber bores and wherein adjoining surfaces are defined between the at least one guide bore block and adjacent fiber bore blocks; and (e) machining the adjoining surfaces between the fiber bore blocks and between the guide bore block and the array of fiber bore blocks such that when the fiber bore blocks and the at least one guide bore block are assembled together, the desired relationships between successive fiber bores and between the fiber bores and the at least one guide bore are achieved.

2. The method of claim 1 wherein the fiber bore blocks are formed by machining in a first radial direction against a cylindrical ferrule until a first planar surface is formed along the length of the ferrule, the ceramic ferrule already defining a precisely machined bore extending therethrough in the axial direction, and machining in a second radial direction against the cylindrical ferrule until a second planar surface is formed along the length of the ferrule that is opposite of and generally parallel with the first planar surface.

3. The method of claim 2 further comprising the step of machining in opposed third and fourth radial directions against the cylindrical ferrule until opposite and parallel third and fourth planar surfaces are formed along the length of the ferrule which are generally perpendicular to the first and second planar surfaces such that the ferrule is generally rectilinear.

4. The method of claim 1 wherein the at least one guide bore block comprises a first guide bore block and second guide bore block and wherein the array of fiber bore blocks is arranged in a row between the first and second guide bore blocks such that the fiber bores are generally co-planar.

5. The method of claim 4 further comprising the step of adjoining a first spacer block against the row of fiber bore blocks wherein adjoining surfaces are defined between the first spacer block and the adjacent row of fiber bore blocks.

6. The method of claim 5 further comprising the step of adjoining a second spacer block against the row of fiber bore blocks opposite the first spacer block wherein adjoining surfaces are defined between the second spacer block and the adjacent row of fiber bore blocks.

7. The method of claim 1 wherein the fiber bore blocks can be rearranged in the array to adjust the relative location of the fiber bores.

8. The method of claim 4 wherein the step of adjoining the first and second guide bore blocks to the array of fiber bore blocks comprises (a) boring a first passageway through the first guide bore block, (b) boring a second passageway at least partially into the second guide bore block and in alignment with the first passageway, (c) bolting through the first and second passageways to force the first and second guide blocks toward each other to clamp against the row of fiber bore blocks.

9. The method of claim 1 wherein fiber bore forming pins are optical fiber that remain in the molded multi-fiber ferrule.

10. The method of claim 1 wherein the fiber bore forming pins are removable from the multi-fiber ferrule after it is molded.

11. A method of manufacturing a fiber bore block for use in a guide block assembly that is used for aligning and retaining a plurality of fiber bore forming pins and at least one guide bore forming pin in precise relation to each other during molding of a multi-fiber ferrule around such pins, the method comprising the steps of:

(a) machining in a first radial direction against a cylindrical ferrule until a first planar surface is formed along the length of the ferrule, the cylindrical ferrule already defining a precisely machined bore extending therethrough in the axial direction;

(b) machining in a second radial direction against the cylindrical ferrule until a second planar surface is formed along the length of the ferrule that is opposite of and generally parallel with the first planar surface.

12. The method of claim 11 further comprising the step of machining in opposed third and fourth radial directions against the cylindrical ferrule until opposite and parallel third and fourth planar surfaces are formed along the length of the ferrule which are generally perpendicular to the first and second planar surfaces such that the ferrule is generally rectilinear.

13. The method of claim 11 wherein the cylindrical ferrules are ceramic.

* * * * *